(12) United States Patent
Teramoto et al.

(10) Patent No.: US 11,691,329 B2
(45) Date of Patent: Jul. 4, 2023

(54) THERMOFORMING DEVICE AND THERMOFORMING METHOD

(71) Applicant: ASANO LABORATORIES CO., LTD., Aichi (JP)

(72) Inventors: Kazunori Teramoto, Aichi-gun (JP); Shogo Takai, Aichi-gun (JP); Yusuke Suzuki, Kiyosu (JP); Kimihiro Iimura, Kiyosu (JP)

(73) Assignee: ASANO LABORATORIES CO., LTD., Aichi-gun (JP)

(*) Notice: Subject to any disclaimer, the term of this patent is extended or adjusted under 35 U.S.C. 154(b) by 0 days.

(21) Appl. No.: 18/012,436

(22) PCT Filed: Nov. 23, 2021

(86) PCT No.: PCT/JP2021/042864
§ 371 (c)(1),
(2) Date: Dec. 22, 2022

(87) PCT Pub. No.: WO2022/137946
PCT Pub. Date: Jun. 30, 2022

(65) Prior Publication Data
US 2023/0173738 A1 Jun. 8, 2023

(30) Foreign Application Priority Data
Dec. 22, 2020 (JP) ................... 2020-212373

(51) Int. Cl.
*B29C 51/42* (2006.01)
(52) U.S. Cl.
CPC .......... *B29C 51/422* (2013.01); *B29C 51/428* (2013.01); *B29C 51/426* (2013.01)
(58) Field of Classification Search
CPC ... B29C 51/422; B29C 51/428; B29C 51/426; B29C 51/421; B29C 51/42; B29C 33/02
See application file for complete search history.

(56) References Cited

U.S. PATENT DOCUMENTS 987,293 A * 3/1911 Gale ..................... F24C 15/105
219/486
3,393,292 A * 7/1968 Ritscher ................ B30B 15/064
219/544
(Continued)

FOREIGN PATENT DOCUMENTS

JP S58-101712 U 7/1983
JP 2007-30422 A 2/2007
(Continued)

OTHER PUBLICATIONS

Dec. 28, 2021 Written Opinion of the International Searching Authority for International Application No. PCT/JP2021/042864.

*Primary Examiner* — Matthew J Daniels
(74) *Attorney, Agent, or Firm* — Oliff PLC (57) ABSTRACT

A thermoforming device according to the present invention has a masking plate and a heater block. A plurality of the heater blocks are disposed with a space therebetween in a planar direction of the masking plate. The thickness of the masking plate is 0.2-3.0 mm. The distance of the space is 1-15 mm, and the distance of the space is set at least five times larger than the thickness of the masking plate. Heat to be transmitted to the masking plate from a high temperature heater block is more easily transmitted in the thickness direction of the masking plate than in the surface direction of the masking plate, and is more easily transmitted to the sheet than to a portion, of the masking plate, corresponding to a low temperature heater block, whereby a temperature difference is provided between different zones of the masking plate.

17 Claims, 7 Drawing Sheets

(56) References Cited

U.S. PATENT DOCUMENTS

| | | | | |
|---|---|---|---|---|
| 4,208,574 | A | * | 6/1980 | Schafer .................... H05B 3/22 |
| | | | | 374/137 |
| 4,249,066 | A | * | 2/1981 | Eberhard .............. B30B 15/064 |
| | | | | 219/505 |
| 4,269,586 | A | * | 5/1981 | Ronayne ................. B29C 33/04 |
| | | | | 249/141 |
| 5,158,132 | A | * | 10/1992 | Guillemot ............... B29C 33/04 |
| | | | | 219/448.11 |
| 5,441,675 | A | * | 8/1995 | Souders ............. B29C 33/3814 |
| | | | | 264/402 |
| 5,802,856 | A | * | 9/1998 | Schaper .................... B01L 7/52 |
| | | | | 118/724 |
| 5,983,644 | A | * | 11/1999 | Bolandi ............ H01L 21/67103 |
| | | | | 62/3.2 |
| 7,179,639 | B2 | * | 2/2007 | Pottathil ............... B01L 3/5023 |
| | | | | 436/515 |
| 7,331,198 | B1 | | 2/2008 | Yamakawa et al. |
| 7,870,892 | B2 | * | 1/2011 | Gawthrop .......... B60H 1/00007 |
| | | | | 62/3.61 |
| 8,546,732 | B2 | * | 10/2013 | Singh ..................... H01C 17/28 |
| | | | | 219/486 |
| 2009/0011063 | A1 | * | 1/2009 | Davie .................... B29C 33/02 |
| | | | | 425/144 |
| 2012/0267828 | A1 | * | 10/2012 | Halford ................ B29C 33/302 |
| | | | | 264/327 |
| 2013/0072035 | A1 | | 3/2013 | Gaff et al. |
| 2013/0269368 | A1 | | 10/2013 | Gaff et al. |
| 2018/0354188 | A1 | | 12/2018 | Teramoto et al. |

FOREIGN PATENT DOCUMENTS

| | | |
|---|---|---|
| JP | 2008-238442 A | 10/2008 |
| JP | 2009-31573 A | 2/2009 |
| JP | 4457438 B2 | 4/2010 |
| JP | 2014-127310 A | 7/2014 |
| JP | 2015-509280 A | 3/2015 |
| TW | 201720624 A | 6/2017 |

* cited by examiner

THERMOFORMING DEVICE AND THERMOFORMING METHOD

CROSS-REFERENCE TO RELATED APPLICATIONS

This is a US national phase application based on the PCT International Patent Application No. PCT/JP2021/042864 filed on Nov. 23, 2021, and claiming the priority to Japanese Patent Application No. 2020-212373 filed on Dec. 22, 2020, the entire contents of which are incorporated by reference herein.

TECHNICAL FIELD

The present disclosure relates to a thermoforming device and a thermoforming method.

BACKGROUND ART

Patent document 1 discloses the technique for providing a temperature difference in a glass by setting different distances between a plurality of heaters and the glass when deforming the glass.

Patent document 2 discloses the technique for keeping a hot plate, which is a wafer table, at a predetermined temperature with use of a Peltier element which is a cooling device, in order to maintain wavers at a uniform temperature in a semiconductor manufacturing apparatus.

RELATED ART DOCUMENTS

Patent Documents

Patent document 1: Japanese Patent No. 4457438
Patent document 2: Japanese unexamined patent application publication No. 2015-509280

SUMMARY OF INVENTION

Problems to be Solved by the Invention

When thermoforming a thermoplastic sheet, the sheet may include a portion for which a heating temperature has to be reduced to suppress stretching of this portion during forming and a portion for which a heating temperature has to be increased to improve moldability of this portion. In such a case, it is therefore desirable to thermoform the sheet with a temperature difference between those portions of the sheet. Patent documents 1 and 2 neither disclose such thermoforming of the thermoplastic sheet.

The present disclosure has been made to address the above problems and has a purpose to provide a thermoforming device capable of thermoforming a thermoplastic sheet by providing a temperature difference between portion to portion in the sheet, and a thermoforming method.

Means of Solving the Problems

To achieve the above-mentioned purpose, one aspect of the present disclosure provides a thermoforming device comprising: a masking plate formed of a metal plate for heating a thermoplastic sheet in contact with the sheet; and heater blocks for heating the masking plate by contact with an opposite surface of the masking plate to a contact surface that contacts the sheet; wherein the heater blocks are placed with a space from each other in a planar direction of the masking plate, the masking plate has a thickness of 0.2 mm to 3.0 mm, the space has a distance of 1 mm to 15 mm, the distance of the space is at least five times larger than the thickness of the masking plate, so that heat transferred from the heater block for high temperature to the masking plate is easily transferred in a thickness direction of the masking plate more than in the planar direction of the masking plate, allowing the heat to be easily transferred to the sheet more than to a zone of the masking plate corresponding to the heater block for low temperature, and a zone of the masking plate corresponding to the high-temperature heater block is heated to a high temperature while the zone of the masking plate corresponding to the low-temperature heater block is heated to a low temperature to make a temperature difference between the zones of the masking plate.

According to this aspect, the temperature difference can be provided between the set temperatures of the heater blocks to heat the masking plate at different temperatures between the zones in the planar direction. Thus, in a heating step during thermoforming of the thermoplastic sheet, the masking plate heated with a temperature difference between the zones in the planar direction is put in contact with the sheet, so that the sheet can be heated at different temperatures between sheet portions in the planar direction. In a forming step, the sheet can be formed while the portions thereof are different in temperature from each other in the planar direction. This device can therefore thermoform a thermoplastic sheet with a temperature difference between the portions of the sheet during thermoforming of the sheet.

Furthermore, the thickness of the masking plate is reduced and the space between the heater blocks is set with a sufficient distance, i.e., width. Thus, the heat transferred from each heater block to the masking plate is less likely to affect each other in the masking plate. Consequently, when the temperature difference is provided between the set temperatures of the heater blocks, a temperature difference can be provided between the portions of the sheet.

Since the heater blocks are spaced apart from each other with the space of a sufficient distance, the heats transferred from the heater blocks to the masking plate are less likely to affect each other in the masking plate. Thus, the heat transferred from each of the heater blocks to the masking plate is more reliably transferred to the sheet located ahead in the thickness direction of the masking plate. Therefore, when the temperature difference is provided between the set temperatures of the heater blocks, a temperature difference can be provided between the portions of the sheet.

In the foregoing aspect, preferably, the thickness of the masking plate is 0.2 mm to 1.5 mm.

According to this aspect, the thickness of the masking plate is further reduced, so that the heats transferred from the heater blocks to the masking plate are less likely to be transferred in the planar direction of the masking plate, whereas the heats are easily transferred to the sheet located ahead in the thickness direction of the masking plate. Therefore, when the temperature difference is provided between the set temperatures of the heater blocks, a temperature difference can be more reliably provided between the portions of the sheet.

In the foregoing aspect, preferably, the heater blocks include the high-temperature heater block and the low-temperature heater block, and the thermoforming device further comprises an air cooling circuit for cooling the low-temperature heater block with air.

According to this aspect, the low-temperature heater block can be effectively cooled. Thus, a temperature difference can be easily provided between the set temperature of the high-temperature heater block and the set temperature of the low-temperature heater block. This makes it possible to further make a temperature difference between the portions of the sheet.

The foregoing aspect preferably further comprises a vacuum suction circuit for sucking the masking plate to the heater blocks by vacuum suction.

According to this aspect, the masking plate can tightly contact the heater blocks, so that the heats from the heater blocks are easily transferred to the masking plate. Therefore, when the temperature difference is provided between the set temperatures of the heater blocks, it is more reliably possible to heat the sheet at different temperatures between the for each portion.

In the foregoing aspect, preferably, the heater blocks include: hot plates each formed of a metal plate and in contact with the masking plate; and heaters for heating the hot plates, and the space is formed between the hot plates placed in the planar direction of the masking plate.

According to this aspect, when the size of the hot plate is adjusted while the heaters are kept unchanged, the distance of the space can be easily adjusted with reduced costs.

Another aspect of the present disclosure to solve the above-described purpose provides a thermoforming method comprising: a heating step in which a masking plate formed of a metal plate heats a thermoplastic sheet in contact with the sheet; and a forming step in which the sheet in a heated state is formed with a mold, wherein, in the heating step, the heater blocks placed with a space from each other in a planar direction of the masking plate contact an opposite surface of the masking plate to a contact surface that contacts the sheet and heat the masking plate, at least one heater block of the heater blocks heats the masking plate at a different temperature from a temperature for another heater block, the masking plate has a thickness of 0.2 mm to 3.0 mm, the space has a distance of 1 mm to 15 mm, the distance of the space is at least five times larger than the thickness of the masking plate, so that heat transferred from a high-temperature heater block to the masking plate is easily transferred in a thickness direction of the masking plate more than in the planar direction of the masking plate, allowing the heat to be easily transferred to the sheet more than to a zone of the masking plate corresponding to a low-temperature heater block, and a zone of the masking plate corresponding to the high-temperature heater block is heated to a high temperature while a zone of the masking plate corresponding to the low-temperature heater block is heated to a low temperature to make a temperature difference between the zones of the masking plate.

According to this aspect, the temperature difference can be provided between the set temperatures of the heater blocks to make a temperature difference between the zones of the masking plate in the planar direction thereof. Thus, in the heating step during thermoforming of the thermoplastic sheet, the masking plate provided with a temperature difference between the zones in the planar direction is put in contact with the sheet, so that the sheet can be heated with a temperature difference between sheet portions in the planar direction. In the forming step, the sheet can be formed while the portions thereof are different in temperature from each other in the planar direction. Thus, during thermoforming of the thermoplastic sheet, accordingly, the sheet can be thermoformed with the temperature difference between the portions of the sheet.

Furthermore, the thickness of the masking plate is reduced and the space between the heater blocks is set with a sufficient distance. The heat transferred from each heater block to the masking plate is therefore less likely to affect each other in the masking plate. Consequently, when the temperature difference is provided between the set temperatures of the heater blocks, a temperature difference can be provided between the portions of the sheet.

Since the heater blocks are spaced apart from each other with the space of a sufficient distance, the heats transferred from the heater blocks to the masking plate are less likely to affect each other in the masking plate. Thus, the heat transferred from each of the heater blocks to the masking plate is more reliably transferred to the sheet located ahead in the thickness direction of the masking plate. Therefore, when the temperature difference is provided between the set temperatures of the heater blocks, a temperature difference can be provided between the portions of the sheet.

Effects of the Invention

The thermoforming device and the thermoforming method of the present disclosure can thermoform a thermoplastic sheet while providing a temperature difference between portions of the sheet.

MODE FOR CARRYING OUT THE INVENTION

A detailed description of a thermoforming device 1, which is one of typical embodiments of a thermoforming device and a thermoforming method of this disclosure, will now be given referring to the accompanying drawings.

<Outline of Overall Thermoforming Device>

An outline of an entire thermoforming device 1 will be described first.

(Configuration)

Figure 1:
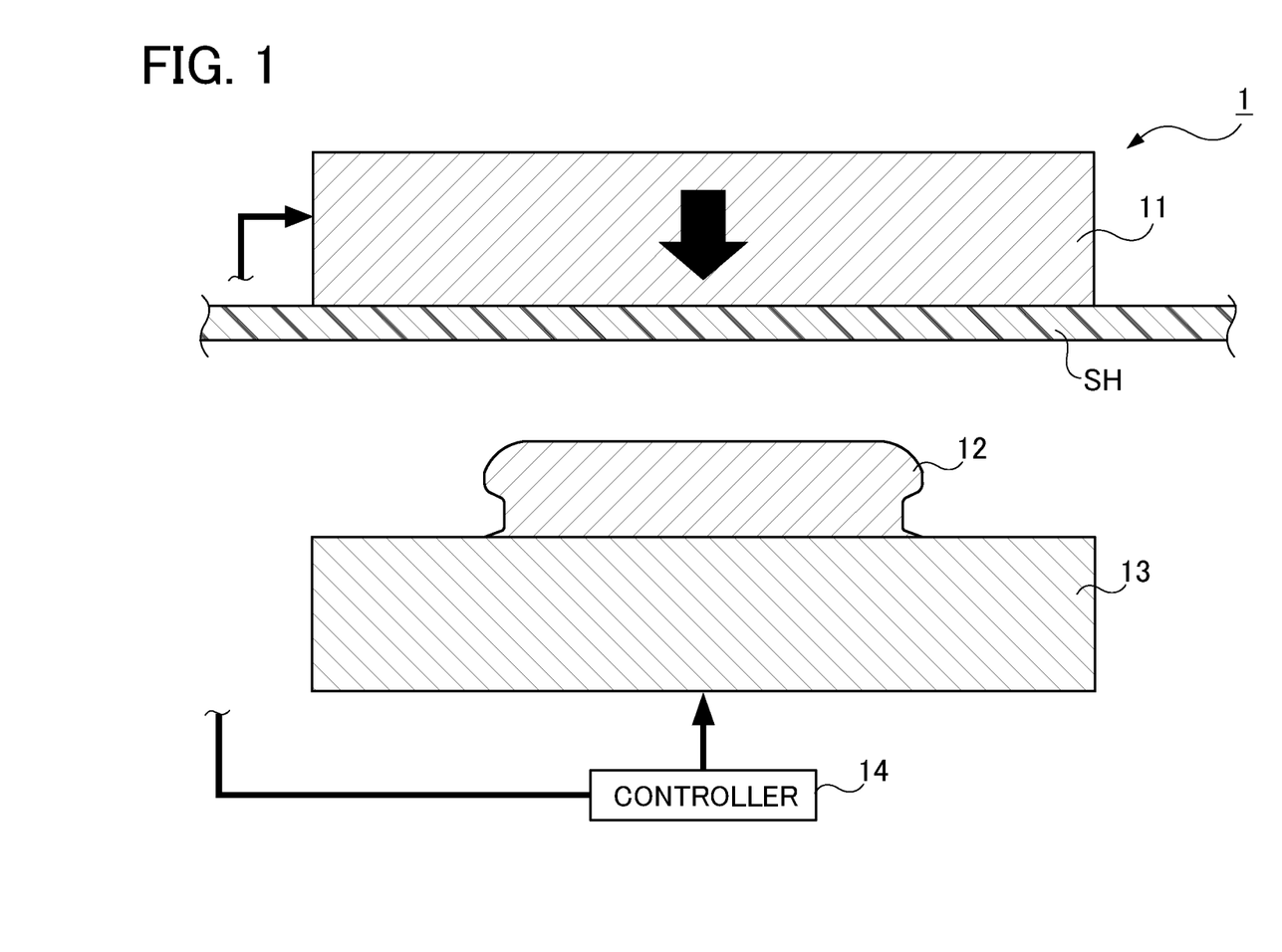
FIG. 1 is a schematic configuration view of a thermoforming device in an embodiment, showing a heating step.

The thermoforming device 1 includes a hot plate unit 11, a mold 12, a table 13, a controller 14, and others, as shown in FIG. 1.

The hot plate unit 11 is configured to contact a thermoplastic sheet SH to heat this sheet SH. The details of this hot plate unit 11 will be described later.

The mold 12 is placed at an opposite position from the hot plate unit 11 with respect to the sheet SH and is configured to form the sheet SH.

The table 13, on which the mold 12 is installed, operates to move the mold 12 up and down.

The controller 14 performs each control of the thermoforming device 1; for example, a control to move up and down the hot plate unit 11 and the table 13 and a control to heat the sheet SH with the hot plate unit 11.

(Operations)

Figure 2:
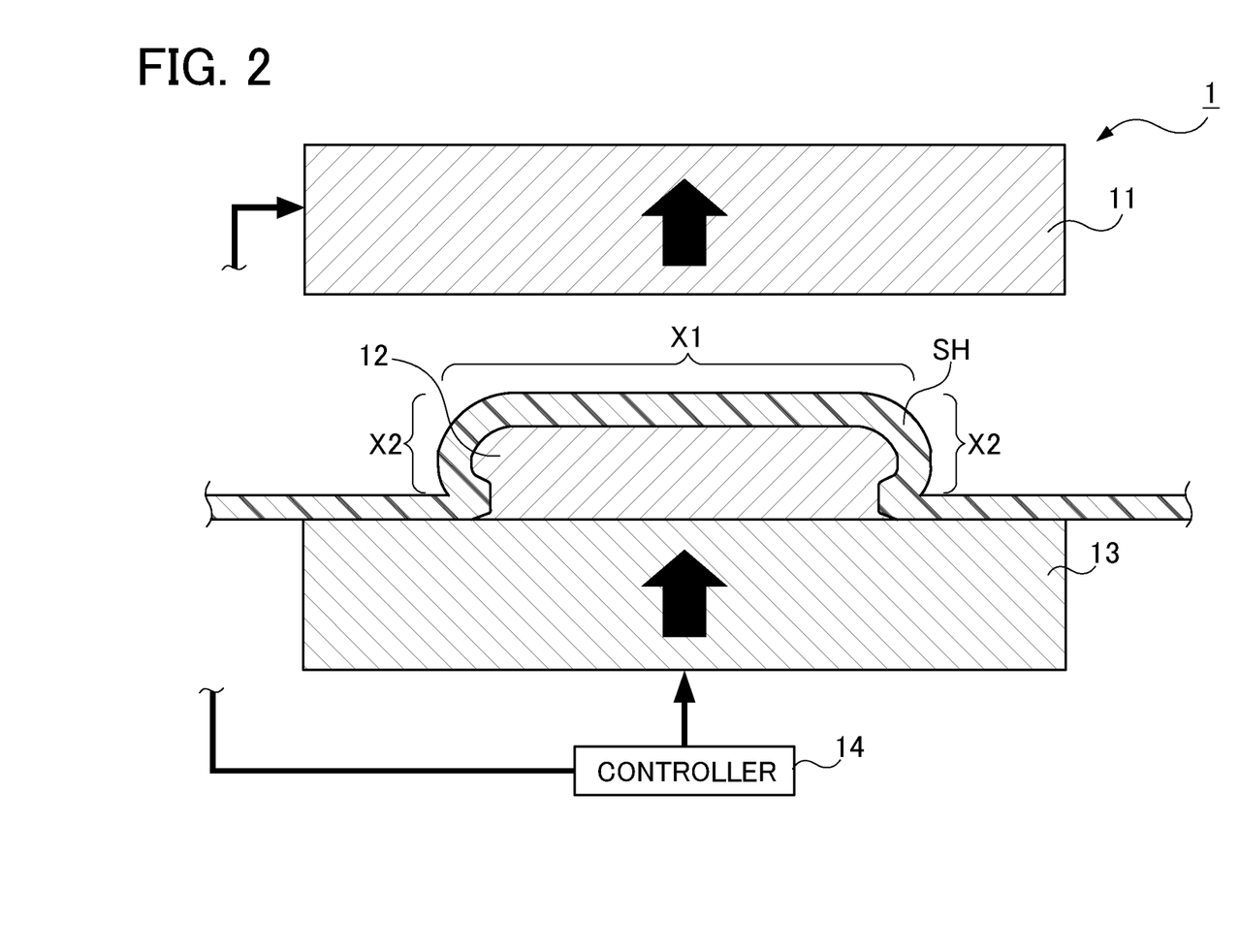
FIG. 2 is a schematic configuration view of the thermoforming device in the embodiment, showing a forming step.

In the above-configured thermoforming device 1, as shown in FIG. 1, in a heating step, the controller 14 causes the hot plate unit 11 (concretely, a masking plate 21 which will be mentioned later) to move down and contact the sheet SH, and the hot plate unit 11 heats the sheet SH. Then, as shown in FIG. 2, in a forming step, the controller 14 causes the hot plate unit 11 to move up, separating the hot plate unit 11 from the sheet SH, and also causes the table 13 to move up, bringing the mold 12 into contact with the sheet SH. Thus, the sheet in a heated state is formed with the mold 12.

<Description of Hot Plate Unit>

The hot plate unit 11 will be described in detail below.

Figure 8:
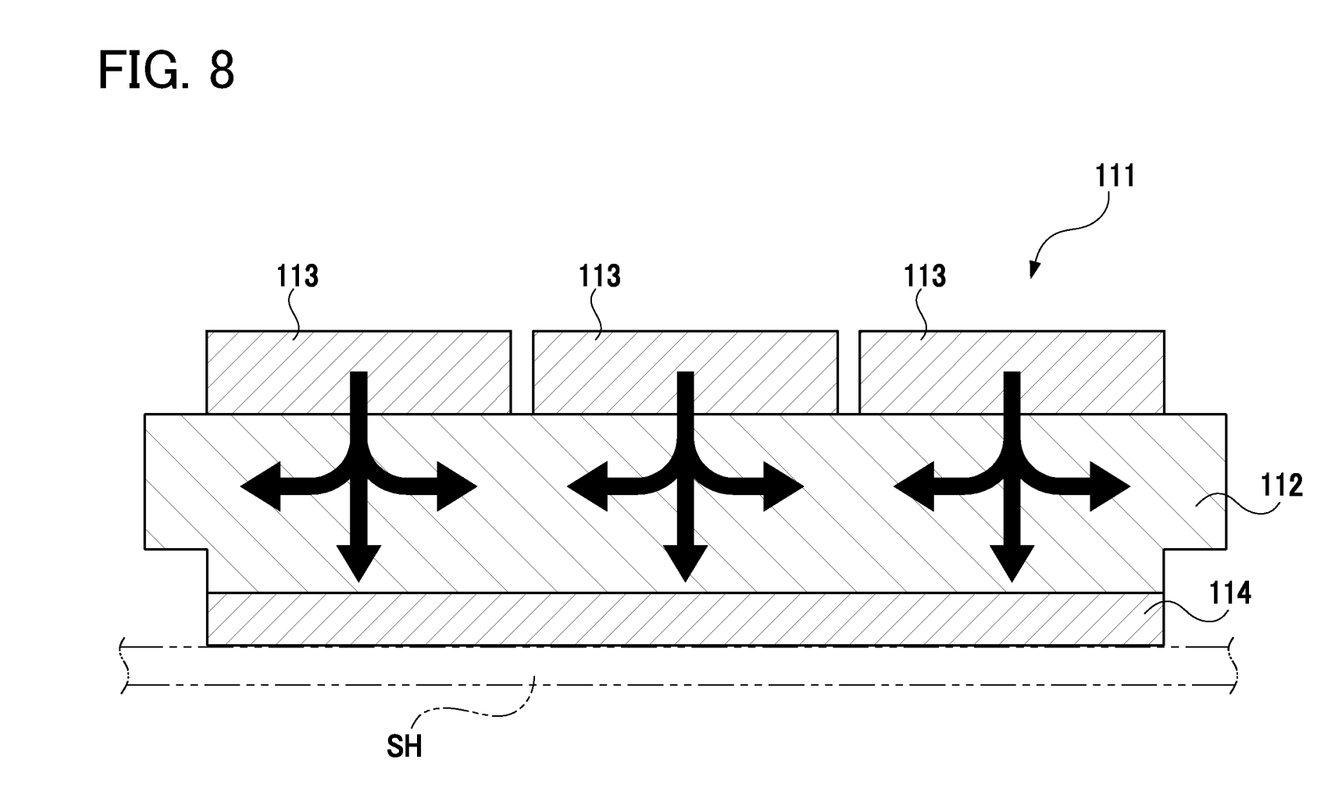
FIG. 8 is a view of a related art.

As shown in FIG. 8, a conventional hot plate unit 111 is configured such that a plurality of heaters 113 are placed on a single hot plate 112 provided on a face plate 114. The thus configured conventional hot plate unit 111 is intended to make a sheet SH to contact the face plate 114 that is uniformly entirely heated by the heaters 113 to uniformly heat the sheet SH.

In some cases, however, the sheet SH to be formed may require different forming for each portion; for example, a portion is desired to be formed at a low heating temperature in order to suppress stretching during forming in view of printed patterns (e.g., a portion X1 in FIG. 2) and another portion is desired to be formed at a high heating temperature in order to improve the moldability for a complicated shape (e.g., a portion X2 in FIG. 2).

However, in the conventional hot plate unit 111 shown in FIG. 8, even when the heaters 113 are set with different temperatures, because of the hot plate 112 that has a large thickness and is formed of a one-piece plate, the heat will be transferred from each of the heaters 113 to the hot plate 112 not only in the thickness direction (downward in FIG. 8) but also in lateral directions (rightward and leftward in FIG. 8) in the hot plate 112 as indicated with arrows in the figure. Further, since the face plate 114 has a relatively large thickness (e.g., 15 mm), the heat is transferred from the hot plate 112 to the face plate 114 not only in the thickness direction (downward in FIG. 8) but also in the lateral directions (rightward and leftward in FIG. 8) in the face plate 114. It is therefore difficult to provide a temperature difference between zones of the face plate 114, thus making it hard to provide a temperature difference between portions of the sheet SH in contact with the face plate 114.

In the present embodiment, therefore, the structure of the hot plate unit 11 is designed to thermoform a sheet SH while providing a temperature difference between the portions of the sheet SH during thermoforming of the sheet SH.

Figure 3:
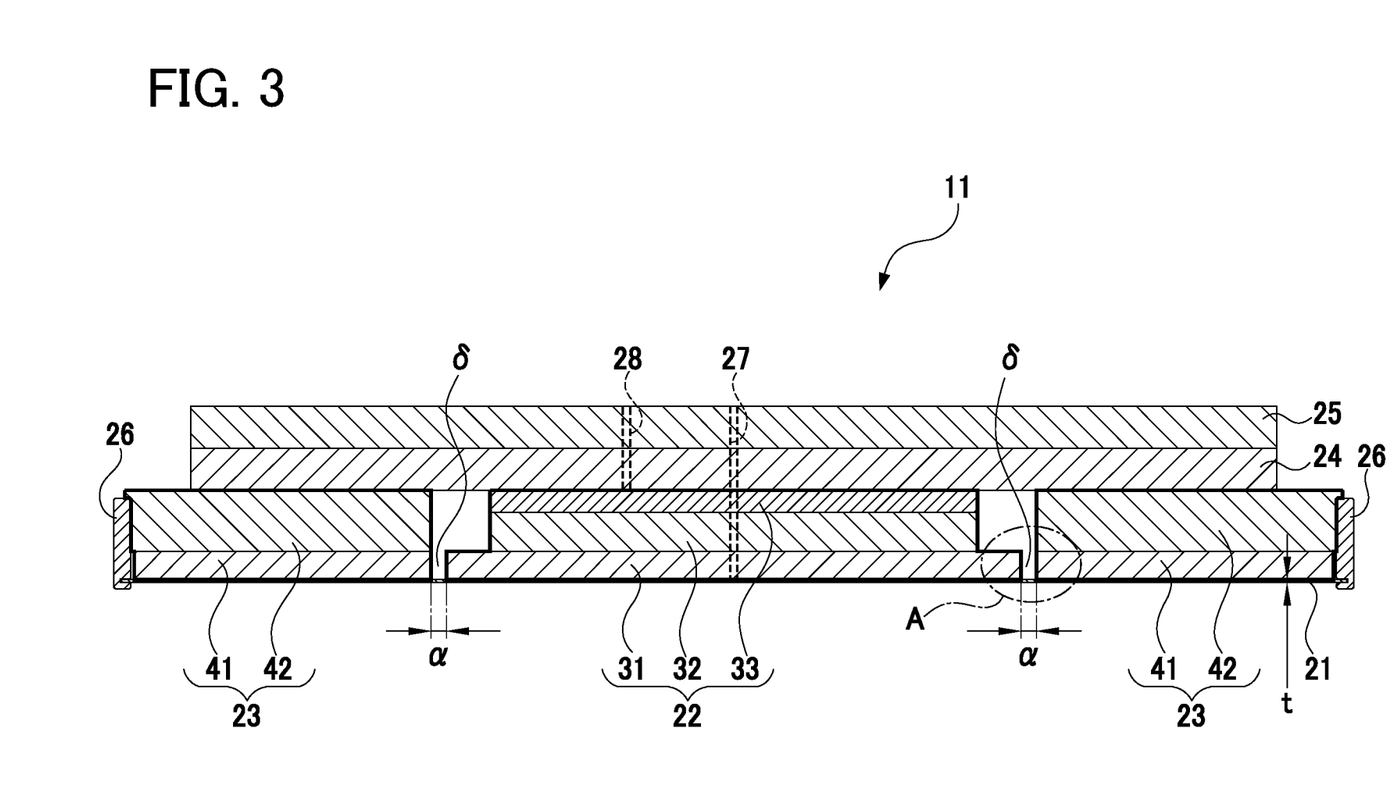
FIG. 3 is a cross-sectional view of a hot plate unit.

Specifically, the hot plate unit 11 includes, as shown in FIG. 3, a masking plate 21, an inner heater block 22, an outer heater block 23, a heat insulating member 24, an upper plate 25, a masking plate retainer 26, a vacuum suction circuit 27, an air cooling circuit 28, and others.

The masking plate 21 is a metal plate member provided as a lowest part of the hot plate unit 11 (that is, a closest part to the sheet SH) and serves to contact and heat the sheet SH.

Figure 4:
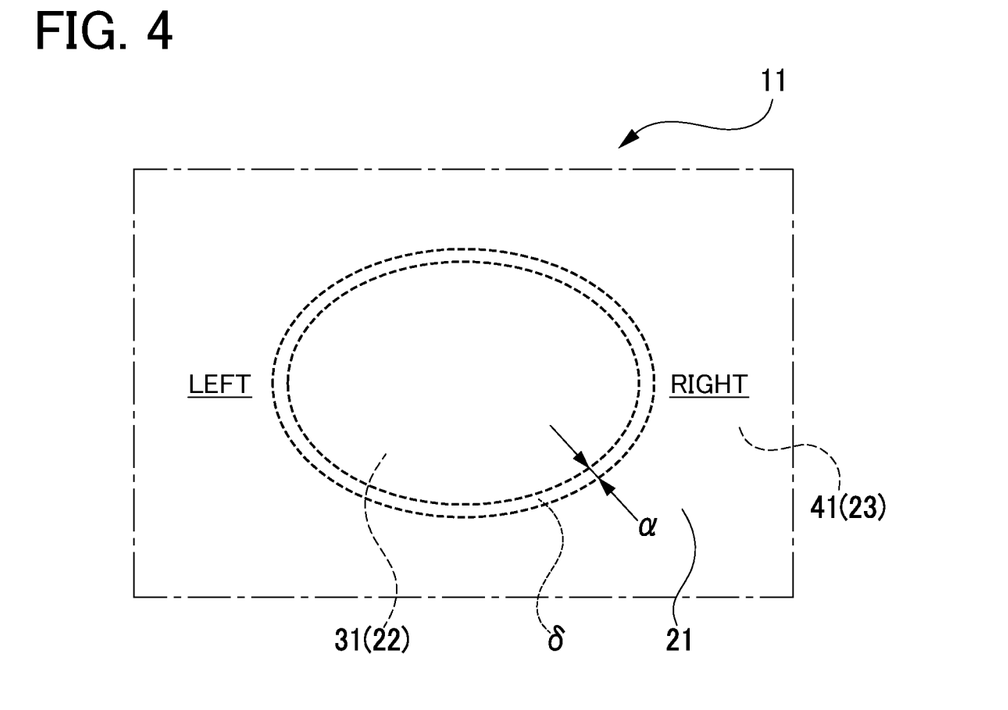
FIG. 4 is a bottom view of a central part of the hot plate unit.

The inner heater block 22 is a heating part for heating the masking plate 21 by contact with the upper surface of the masking plate 21. Herein, the upper surface of the masking plate 21 is a surface (a topside surface in FIG. 3) opposite to the contact surface (a downside surface in FIG. 3) of the masking plate 21 that contacts the sheet SH. As shown in FIG. 4, this inner heater block 22 is located, when seen from the bottom (the downside in FIG. 3), inside the outer heater block 23 and has an oval outer shape. The inner heater block 22 is one example of a heater block for low temperature (a low-temperature heater block) of the present disclosure.

The inner heater block 22 includes, as shown in FIG. 3, an inner heat plate 31, an inner heater 32 (an inner cartridge heater), and a cooling plate 33.

The inner heat plate 31 is a plate-shaped member made of metal (e.g., stainless steel or aluminum), which contacts the upper surface of the masking plate 21. This inner heat plate 31 is placed with a space δ from an outer heat plate 41 mentioned later in a planar direction of the masking plate 21 (right and left directions in FIG. 3 and back and front directions of a drawing sheet of FIG. 3).

The inner heater 32 is a device that is placed on the upper surface (the upside surface in FIG. 3) of the inner heat plate 31 and functions to heat the inner heat plate 31.

The cooling plate 33 is a plate-shaped member that is placed on the upper surface (the upside surface in FIG. 3) of the inner heater 32 and is cooled by air fed through the air cooling circuit 28 to cool the inner heater block 22 (the inner heat plate 31).

The outer heater block 23 is a heating part for heating the masking plate 21 by contact with the upper surface of the masking plate 21. As shown in FIG. 4, this outer heater block 23 is located outside the inner heater block 22 in the planar direction of the masking plate 21, surrounding the inner heater block 22, when seen from the bottom (the downside in FIG. 3). The outer heater block 23 is one example of a heater block for high temperature (a high-temperature heater block) of the present disclosure.

The outer heater block 23 includes, as shown in FIG. 3, an outer heat plate 41 and an outer heater 42 (an outer cartridge heater).

The outer heat plate 41 is a plate-shaped member made of metal (e.g., stainless steel and aluminum), which contacts the upper surface of the masking plate 21. This outer heat plate 41 is spaced apart with the space δ from the inner heat plate 31 in the planar direction of the masking plate 21.

The outer heater 42 is a device that is placed on the upper surface (the upside surface in FIG. 3) of the outer heat plate 41 and functions to heat the outer heat plate 41.

The heat insulating member 24 serves to insulate between the inner heater block 22 and the upper plate 25 and between the outer heater block 23 and the upper plate 25. The masking plate retainer 26 are metal fittings for retaining the masking plate 21.

The vacuum suction circuit 27 is a suction passage for sucking the masking plate 21 to the inner heater block 22 and the outer heater block 23 by vacuum suction, and is connected to a suction unit not shown.

The air cooling circuit 28 is a passage for flowing air to cool the inner heat plate 31 of the inner heater block 22 and is connected to an air supply unit not shown. For example, assuming that the inner heater block 22 is the low-temperature heater block and the outer heater block 23 is the high-temperature heater block, the air cooling circuit 28 is used to cool the inner heater block 22 which is the low-temperature heater block.

In the present embodiment, the thickness t of the masking plate 21 is set as small as, for example, 0.2 mm to 3.0 mm, more preferably, 0.2 mm to 1.5 mm. Further, the masking plate 21 is made of e.g. stainless steel. Thus, the masking plate 21 is hardly warped, even though the thickness t of the masking plate 21 is small.

In the present embodiment, as shown in FIGS. 3 and 4, the inner heater block 22 and the outer heater block 23 are spaced apart from each other with the space δ in the planar direction of the masking plate 21. This space δ is specifically formed between the inner heat plate 31 (of the inner heater block 22) and the outer heat plate 41 (of the outer heater block 23) which are arranged in the planar direction of the masking plate 21.

The distance α of the space δ is set to 1 mm to 15 mm, which is for example at least five times larger than the thickness t of the masking plate 21.

In the present embodiment, in the hot plate unit 11 configured as above, a temperature difference is provided between the set temperature of the inner heater 32 and the set temperature of the outer heater 42, thereby providing a temperature difference between the inner heat plate 31 and the outer heat plate 41. For example, the set temperature of the inner heater 32 is set lower than the set temperature of the outer heater 42 to use the inner heater block 22 as the low-temperature heater block and the outer heater block 23 as the high-temperature heater block. At that time, the inner heat plate 31 of the inner heater block 22 is cooled with air through the air cooling circuit 28, so that the inner heater block 22 is adjusted to the low-temperature heater block. When the temperature difference is provided as above between the set temperature of the inner heater 32 and the set temperature of the outer heater 42, the masking plate 21 is heated with different temperatures from zone to zone. In other words, the masking plate 21 can be zoned for each temperature.

Figure 5:
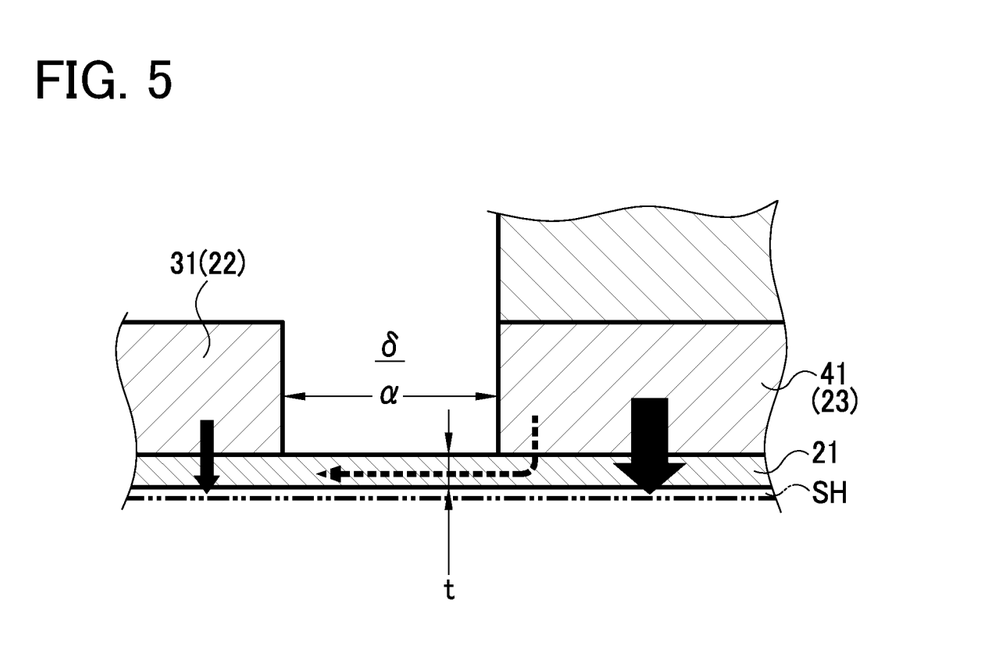
FIG. 5 is an enlarged view of a part A in FIG. 3.

In this case, in the present embodiment, the thickness of the masking plate 21 is small (e.g., t=0.2 mm to 3.0 mm, more preferably, t=0.2 mm to 1.5 mm) and further the space δ (the distance α of the space δ=1 mm to 15 mm) is provided between the inner heat plate 31 of the inner heater block 22 and the outer heat plate 41 of the outer heater block 23, as shown in FIG. 5.

Accordingly, the heat is easily transferred from the outer heat plate 41 to the masking plate 21 in the thickness direction of the masking plate 21 (the direction indicated with a thick arrow in the figure) more than in the planar direction of the masking plate 21 (the direction indicated with a dashed arrow in the figure). The heat from the outer heat plate 41 on the high temperature side to the masking plate 21 is therefore easily transferred to the sheet SH more than to the zone of the masking plate 21 corresponding to the inner heat plate 31 on the low temperature side. In this manner, the heat transferred from the low-temperature inner heat plate 31 to the masking plate 21 is less influenced by the heat transferred from the high-temperature outer heat plate 41 to the masking plate 21. Consequently, the zone of the masking plate 21 corresponding to the outer heat plate 41 is heated to a high temperature and the zone of the masking plate 21 corresponding to the inner heat plate 31 is heated to a low temperature, so that a temperature difference can be provided between these zones of the masking plate 21. Therefore, a temperature difference can be provided between the portions the sheet SH that contacts with the masking plate 21.

The present applicant measured the temperature distributions in the masking plate 21 and the sheet SH. The measurement was conducted under the conditions: the thickness t of the masking plate 21 was 1.0 mm, the distance α of the space δ was 5 mm (five times the thickness t of the masking plate 21), the set temperature of the inner heater 32 was 125° C., and the set temperature of the outer heater 42 was 170° C.

Figure 6:
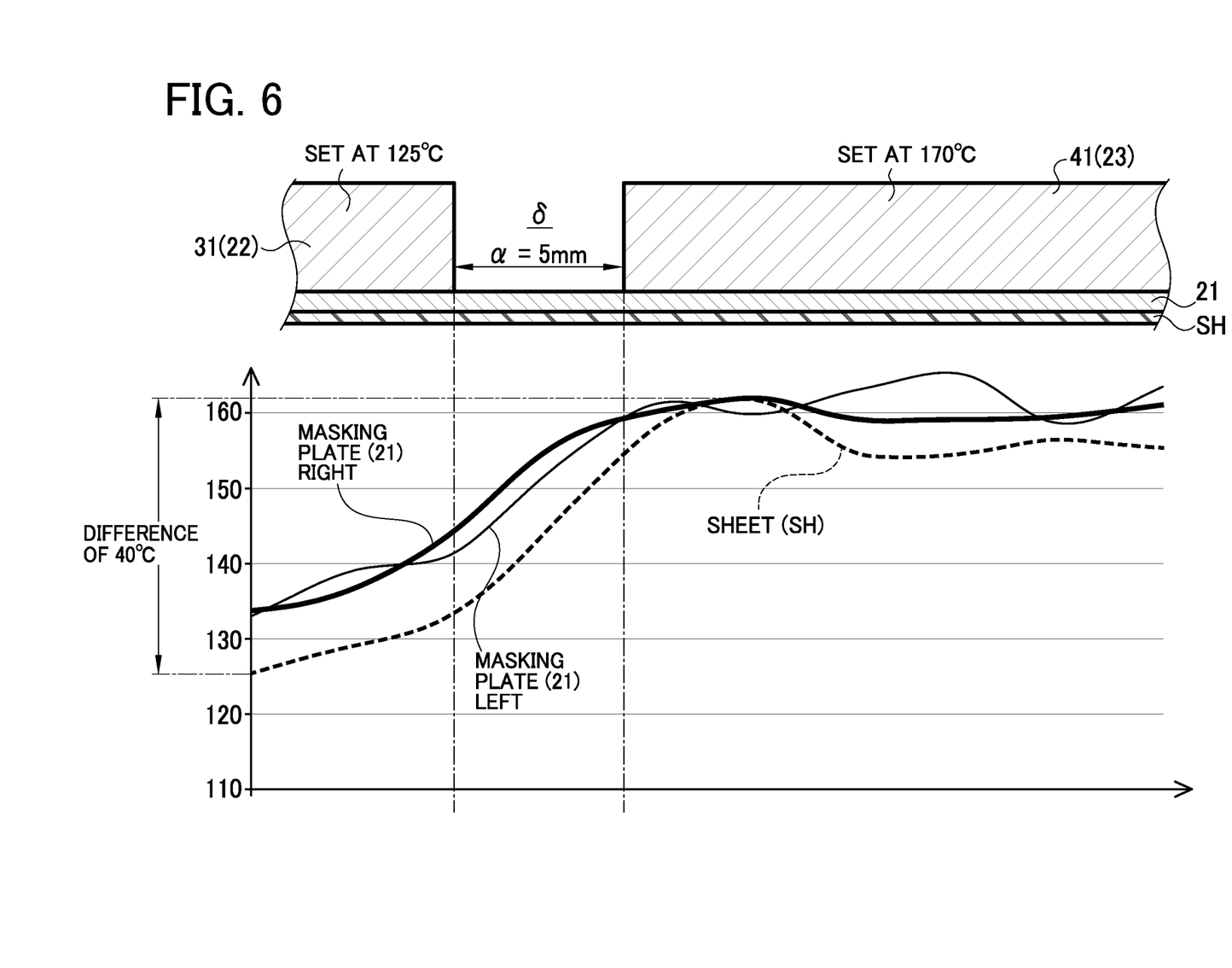
FIG. 6 is a diagram showing temperature distributions in a masking plate and a sheet.

The above conditions could set a temperature difference of about 40° C. in the sheet SH, as shown in FIG. 6, between a portion that contacts the inner heat plate 31 of the inner heater block 22 and a portion that that contacts the outer heat plate 41 of the outer heater block 23. Since the temperature difference of about 40° C. can be provided between the portions of the sheet SH in the above manner, when thermoforming the sheet SH, e.g., a resin film, it is possible to heat for example a portion (the portion X1 in FIG. 2) having printed patterns at a low heating temperature to suppress stretching of this portion, while heating a portion (the portion X2 in FIG. 2), for which high moldability is desired, at a high heating temperature to allow large stretching of this portion to address a complicated shape. The same results can also be obtained when the thickness t of the masking plate 21 is 0.2 mm to 3.0 mm, other than 1.0 mm. In particular, more desirable results can be obtained when the thickness t of the masking plate 21 is 0.2 mm to 1.5 mm.

In FIG. 6, a legend "MASKING PLATE (21) RIGHT" represents a temperature distribution in the masking plate 21 at a position indicated with "RIGHT" in FIG. 4, and a legend "MASKING PLATE (21) LEFT" represents a temperature distribution in the masking plate 21 at a position indicated with "LEFT" in FIG. 4.

Operations and Effects of the Present Embodiment

According to the present embodiment configured as above, the inner heater block 22 and the outer heater block 23 are placed apart from each other with the space δ in the planar direction of the masking plate 21. Further, the thickness t of the masking plate 21 is set to 0.2 mm to 3.0 mm and the distance α of the space δ is set to 1 mm to 15 mm.

Accordingly, a temperature difference can be provided between the set temperature of the inner heater 32 of the inner heater block 22 and the set temperature of the outer heater 42 of the outer heater block 23 to heat the masking plate 21 at different temperatures between zones in the planar direction. Thus, in the heating step during thermoforming of the sheet SH, the masking plate 21 heated with a temperature difference between the zones in the planar direction is brought in contact with the sheet SH, so that the sheet SH can be heated at different temperatures between sheet portions in the planar direction. In the forming step, the sheet SH can be formed with the mold 12 while the portions of the sheet SH are different in temperature from each other in the planar direction. Consequently, during thermoforming of the sheet SH, the sheet SH can be thermoformed with a temperature difference between the portions of the sheet SH. When thermoforming the sheet SH, it is therefore possible to form for example a portion having a printed pattern (e.g., the portion X1 in FIG. 2) by suppressing stretching of this portion and a portion for which high moldability is desired (e.g., the portion X2 in FIG. 2) by allowing large stretching of this portion.

Moreover, the thickness t of the masking plate 21 is reduced and the space δ between the inner heater block 22 and the outer heater block 23 is set with a sufficient distance α. The heat transferred from the inner heater block 22 to the masking plate 21 and the heat transferred from the outer heater block 23 to the masking plate 21 are less likely to affect each other in the masking plate 22. Consequently, when the temperature difference is provided between the set temperature of the inner heater block 22 and the set temperature of the outer heater block 23, a temperature difference can be provided between the portions of the sheet SH.

Furthermore, the thickness t of the masking plate 21 is preferably set to 0.2 mm to 1.5 mm.

The thickness t of the masking plate 21 is further reduced as above, so that the heats transferred from the inner heater block 22 and the outer heater block 23 to the masking plate 21 are less likely to be transferred in the planar direction of the masking plate 21, whereas the heats are easily transferred to the sheet SH located ahead in the thickness direction of the masking plate 21. Therefore, when the temperature difference is provided between the set temperature of the inner heater block 22 and the set temperature of the outer heater block 23, a temperature difference can be more reliably provided between the portions of the sheet SH.

The distance α of the space δ between the inner heater block 22 and the outer heater block 23 is set at least five times the thickness t of the masking plate 21.

Since the space δ between the inner heater block 22 and the outer heater block 23 has a sufficient distance α as above, the heat transferred from the inner heater block 22 to the masking plate 21 and the heat transferred from the outer heater block 23 to the masking plate 21 are less likely to affect each other in the masking plate 21. Thus, the heat transferred from the inner heater block 22 to the masking plate 21 and the heat transferred from the outer heater block 23 to the masking plate 21 are then more reliably, easily transferred to the sheet SH located ahead in the thickness direction of the masking plate 21. Therefore, the temperature difference provided in set temperature between the inner heater block 22 and the outer heater block 23 enables to more reliably provide a temperature difference between the portions of the sheet SH.

The thermoforming device 1 includes the air cooling circuit 28 for cooling the inner heater block 22 for low temperature with air.

This configuration can effectively cool the low-temperature inner heater block 22. Thus, a temperature difference can be easily provided between the set temperature of the high-temperature outer heater block 23 and the low-temperature inner heater block 22. This makes it possible to further make a temperature difference between the portions of the sheet SH.

The thermoforming device 1 includes the vacuum suction circuit 27 for sucking the masking plate 21 to the inner heater block 22 and the outer heater block 23 by vacuum suction.

Accordingly, the masking plate 21 can tightly contact the inner heater block 22 and the outer heater block 23, so that the heats from the inner heater block 22 and the heat outer heater block 23 are easily transferred to the masking plate 21. Therefore, when the temperature difference is provided between the set temperatures of the inner heater block 22 and the outer heater block 23, it is more reliably possible to heat the sheet SH at different temperatures for each portion.

The space δ is formed between the inner heat plate 31 and the outer heat plate 41, which are arranged in the planar direction of the masking plate 21.

Accordingly, when the size of the inner heat plate 31 and the size of the outer heat plate 41 are adjusted while the inner heater 32 and the outer heater 42 are kept unchanged, the distance α of the space δ can be easily adjusted with reduced costs.

According to the thermoforming method in the present embodiment, in the heating step, the inner heater block 22 and the outer heater block 23, which are placed apart from each other with the space δ in the planar direction of the masking plate 21, heat the masking plate 21. Specifically, the inner heater block 22 heats the masking plate 21 at a different temperature from the outer heater block 23 (that is, a lower temperature than the outer heater block 23).

Since the temperature difference can be provided between the set temperatures of the inner heater block 22 and the outer heater block 23 to make a temperature difference between the zones of the masking plate 21 in the planar direction of the masking plate 21. Thus, in the heating step during thermoforming of a thermoplastic sheet SH, the masking plate 21 provided with the temperature difference between the zones in the planar direction is put in contact with the sheet SH, so that the sheet SH can be heated with a temperature difference between the sheet portions in the planar direction. In the forming step, the sheet SH can be formed while the portions thereof are different in temperature from each other in the planar direction. Thus, during thermoforming of the thermoplastic sheet, the sheet SH can be thermoformed with the temperature difference between the portions of the sheet SH.

The foregoing embodiments are mere examples and give no limitation to the present disclosure. The present disclosure may be embodied in other specific forms without departing from the essential characteristics thereof.

Figure 7:
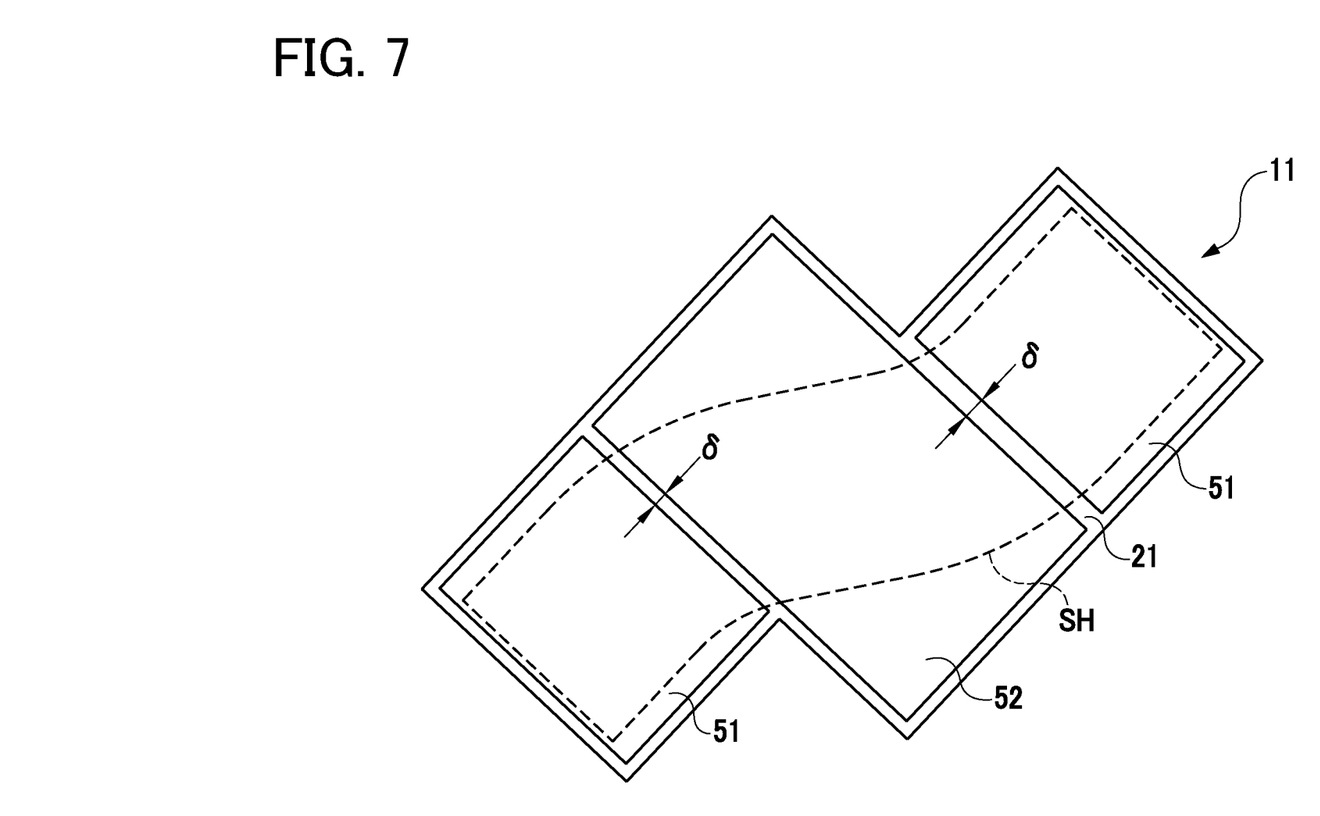
FIG. 7 is a view of a modified example.

For instance, as shown in FIG. 7, a heater block 51 for low temperature and a heater block 52 for high temperature may be arranged with a space δ therebetween in the longitudinal direction of a sheet SH. This can provide a temperature difference between the portions of the sheet SH in the longitudinal direction. FIG. 7 is a top view of the low-temperature heater block 51, the high-temperature heater block 52, and the masking plate 21 in the hot plate unit 11.

The foregoing description exemplifies two heater blocks as the plurality of heater blocks. As an alternative, the thermoforming device 1 may include three of more heater blocks. In this case, the thermoforming device 1 is configured such that, in the heating step, at least one of the heater blocks heats the masking plate 21 at a different temperature from other heater blocks.

Furthermore, for example, the set temperature of the inner heater 32 of the inner heater block 22 and the set temperature of the outer heater 42 of the outer heater block 23 may be set equal to each other, so that the sheet SH can be heated at a uniform temperature and thermoformed.

REFERENCE SIGNS LIST

1 Thermoforming device
11 Hot plate unit
12 Mold
13 Table
14 Controller
21 Masking plate
22 Inner heater block
23 Outer heater block
27 Vacuum suction circuit
28 Air cooling circuit
31 Inner heat plate
32 Inner heater
33 Cooling plate
41 Outer heat plate
42 Outer heater
SH Sheet
t Thickness (of masking plate)
δ Space
α Distance
X1, X2 Portion

The invention claimed is:

1. A thermoforming device comprising:
a masking plate formed of a metal plate for heating a thermoplastic sheet in contact with the sheet; and
heater blocks for heating the masking plate by contact with an opposite surface of the masking plate to a contact surface that contacts the sheet;
wherein the heater blocks are placed with a space from each other in a planar direction of the masking plate,
the masking plate has a thickness of 0.2 mm to 3.0 mm,
the space has a distance of 1 mm to 15 mm, the distance of the space is at least five times larger than the thickness of the masking plate, so that heat transferred from the heater block for high temperature to the masking plate is easily transferred in a thickness direction of the masking plate more than in the planar direction of the masking plate, allowing the heat to be easily transferred to the sheet more than to a zone of the masking plate corresponding to the heater block for low temperature, and a zone of the masking plate corresponding to the high-temperature heater block is heated to a high temperature while the zone of the masking plate corresponding to the low-temperature heater block is heated to a low temperature to make a temperature difference between the zones of the masking plate.

2. The thermoforming device according to claim 1, wherein the thickness of the masking plate is 0.2 mm to 1.5 mm.

3. The thermoforming device according to claim 2, wherein the heater blocks include the high-temperature heater block and the low-temperature heater block, and the thermoforming device further comprises an air cooling circuit for cooling the low-temperature heater block with air.

4. The thermoforming device according to claim 3, further comprising a vacuum suction circuit for sucking the masking plate to the heater blocks by vacuum suction.

5. The thermoforming device according to claim 4, wherein the heater blocks include:
hot plates, each formed of a metal plate, and contacts the masking plate; and
heaters for heating the hot plates, and
the space is formed between the hot plates placed in the planar direction of the masking plate.

6. The thermoforming device according to claim 3, wherein the heater blocks include:
hot plates, each formed of a metal plate, and contacts the masking plate; and
heaters for heating the hot plates, and
the space is formed between the hot plates placed in the planar direction of the masking plate.

7. The thermoforming device according to claim 2, further comprising a vacuum suction circuit for sucking the masking plate to the heater blocks by vacuum suction.

8. The thermoforming device according to claim 7, wherein the heater blocks include:
hot plates, each formed of a metal plate, and contacts the masking plate; and
heaters for heating the hot plates, and
the space is formed between the hot plates placed in the planar direction of the masking plate.

9. The thermoforming device according to claim 2, wherein the heater blocks include:
hot plates, each formed of a metal plate, and contacts the masking plate; and
heaters for heating the hot plates, and
the space is formed between the hot plates placed in the planar direction of the masking plate.

10. The thermoforming device according to claim 1, wherein the heater blocks include the high-temperature heater block and the low-temperature heater block, and the thermoforming device further comprises an air cooling circuit for cooling the low-temperature heater block with air.

11. The thermoforming device according to claim 10, further comprising a vacuum suction circuit for sucking the masking plate to the heater blocks by vacuum suction.

12. The thermoforming device according to claim 11, wherein the heater blocks include:
hot plates, each formed of a metal plate, and contacts the masking plate; and
heaters for heating the hot plates, and
the space is formed between the hot plates placed in the planar direction of the masking plate.

13. The thermoforming device according to claim 10, wherein the heater blocks include:
hot plates, each formed of a metal plate, and contacts the masking plate; and
heaters for heating the hot plates, and
the space is formed between the hot plates placed in the planar direction of the masking plate.

14. The thermoforming device according to claim 1, further comprising a vacuum suction circuit for sucking the masking plate to the heater blocks by vacuum suction.

15. The thermoforming device according to claim 14, wherein the heater blocks include:
hot plates, each formed of a metal plate, and contacts the masking plate; and
heaters for heating the hot plates, and
the space is formed between the hot plates placed in the planar direction of the masking plate.

16. The thermoforming device according to claim 1, wherein the heater blocks include:
hot plates each formed of a metal plate and in contact with the masking plate; and
heaters for heating the hot plates, and
the space is formed between the hot plates placed in the planar direction of the masking plate.

17. A thermoforming method comprising:

a heating step in which a masking plate formed of a metal plate heats a thermoplastic sheet in contact with the sheet; and a forming step in which the sheet in a heated state is formed with a mold, wherein, in the heating step, the heater blocks placed with a space from each other in a planar direction of the masking plate contact an opposite surface of the masking plate to a contact surface that contacts the sheet and heat the masking plate, at least one heater block of the heater blocks heats the masking plate at a different temperature from a temperature for another heater block, the masking plate has a thickness of 0.2 mm to 3.0 mm, the space has a distance of 1 mm to 15 mm, the distance of the space is at least five times larger than the thickness of the masking plate, so that heat transferred from a high-temperature heater block to the masking plate is easily transferred in a thickness direction of the masking plate more than in the planar direction of the masking plate, allowing the heat to be easily transferred to the sheet more than to a zone of the masking plate corresponding to a low-temperature heater block, and a zone of the masking plate corresponding to the high-temperature heater block is heated to a high temperature while a zone of the masking plate corresponding to the low-temperature heater block is heated to a low temperature to make a temperature difference between the zones of the masking plate.

\* \* \* \* \*